United States Patent [19]

Bridges

[11] 4,360,227
[45] Nov. 23, 1982

[54] PIPE COUPLING WITH IMPROVED GASKET

[76] Inventor: Donald Y. Bridges, 3014 Creek Ct., Roswell, Ga. 30075

[21] Appl. No.: 289,279

[22] Filed: Aug. 3, 1981

Related U.S. Application Data

[63] Continuation-in-part of Ser. No. 117,665, Feb. 1, 1980, abandoned.

[51] Int. Cl.³ .............................................. F16L 21/06
[52] U.S. Cl. ...................................... 285/373; 277/101; 285/DIG. 11; 285/55
[58] Field of Search ........ 285/373, 419, 112, 382 U.S. Only, 285/55, 233, DIG. 11; 277/101

[56] References Cited

U.S. PATENT DOCUMENTS

| | | | |
|---|---|---|---|
| 912,638 | 2/1909 | Wold | 285/410 |
| 1,541,601 | 6/1925 | Tribe . | |
| 1,607,943 | 11/1926 | Carson et al. | 285/373 |
| 1,839,761 | 1/1932 | Hutton | 285/411 |
| 2,068,648 | 1/1937 | Koplan | 285/194 |
| 2,752,173 | 6/1956 | Krooss | 285/129 |
| 2,760,792 | 8/1956 | Fons | 285/373 |
| 2,774,617 | 12/1956 | Lanninges | 285/71 |
| 2,899,984 | 8/1959 | Gaffin | 285/373 X |
| 2,913,262 | 11/1959 | De Cenzo et al. | 285/233 |
| 2,950,930 | 2/1960 | Dunmire | 285/110 |
| 2,958,546 | 11/1960 | Lee | 285/21 |
| 2,962,305 | 11/1960 | McCarthy et al. | 285/112 |
| 3,153,550 | 10/1964 | Hollett | 285/373 X |
| 3,211,475 | 10/1965 | Freed et al. | 285/229 |
| 3,215,455 | 11/1965 | Fiala et al. | 285/233 |
| 3,235,293 | 2/1966 | Condon | 285/233 |
| 3,432,189 | 3/1969 | Butler | 285/232 |
| 3,464,722 | 9/1969 | Larkin | 277/101 X |
| 3,501,179 | 3/1970 | Boynton et al. | 285/373 |
| 3,508,766 | 4/1970 | Kessler et al. | 285/21 |
| 3,550,638 | 12/1970 | Smith | 285/373 X |
| 3,563,573 | 2/1971 | Crompton et al. | 285/55 |
| 3,596,934 | 8/1971 | De Cenzo | 285/165 |
| 3,633,947 | 1/1972 | Nelson | 285/233 |
| 3,834,744 | 9/1974 | Masatchi | 285/373 |
| 4,008,937 | 2/1977 | Filippi | 339/15 |
| 4,018,979 | 4/1977 | Young | 285/373 X |

FOREIGN PATENT DOCUMENTS

| | | | |
|---|---|---|---|
| 355620 | 9/1905 | France | 285/112 |
| 1115116 | 12/1955 | France | 285/233 |
| 409971 | 3/1945 | Italy | 285/233 |
| 505671 | 12/1954 | Italy | 285/112 |
| 740433 | 11/1955 | United Kingdom | 285/373 |

*Primary Examiner*—Thomas F. Callaghan

[57] ABSTRACT

A pipe joint for joining a pair of adjacent pipe ends includes an improved gasket contruction. An annular radially outwardly extending flange is provided on the periphery of each pipe adjacent and spaced from the pipe end, a cylindrical coupling member is provided including at least one axial slit in the cylindrical wall thereof and a pair of annular arcuate grooves extending outwardly from the interior of the coupling member, the grooves being shaped so as to form an enclosed annular space between each flange and each arcuate groove, and a gasket for sealing the pipe joint having a pair of spaced apart O-rings shaped to be fitted over the pipe ends and compressed within the annular spaces, a connecting web extending between and joining the O-rings along only a portion of their circumferences, and a shield attached to the inner surface of the connecting web for protecting the web from the pipe ends. The connecting web is positioned under the axial slit in the coupling member. The connecting web is particularly shaped so as to form an evenly compressed, tightly sealing gasket when the pipe joint is assembled.

12 Claims, 17 Drawing Figures

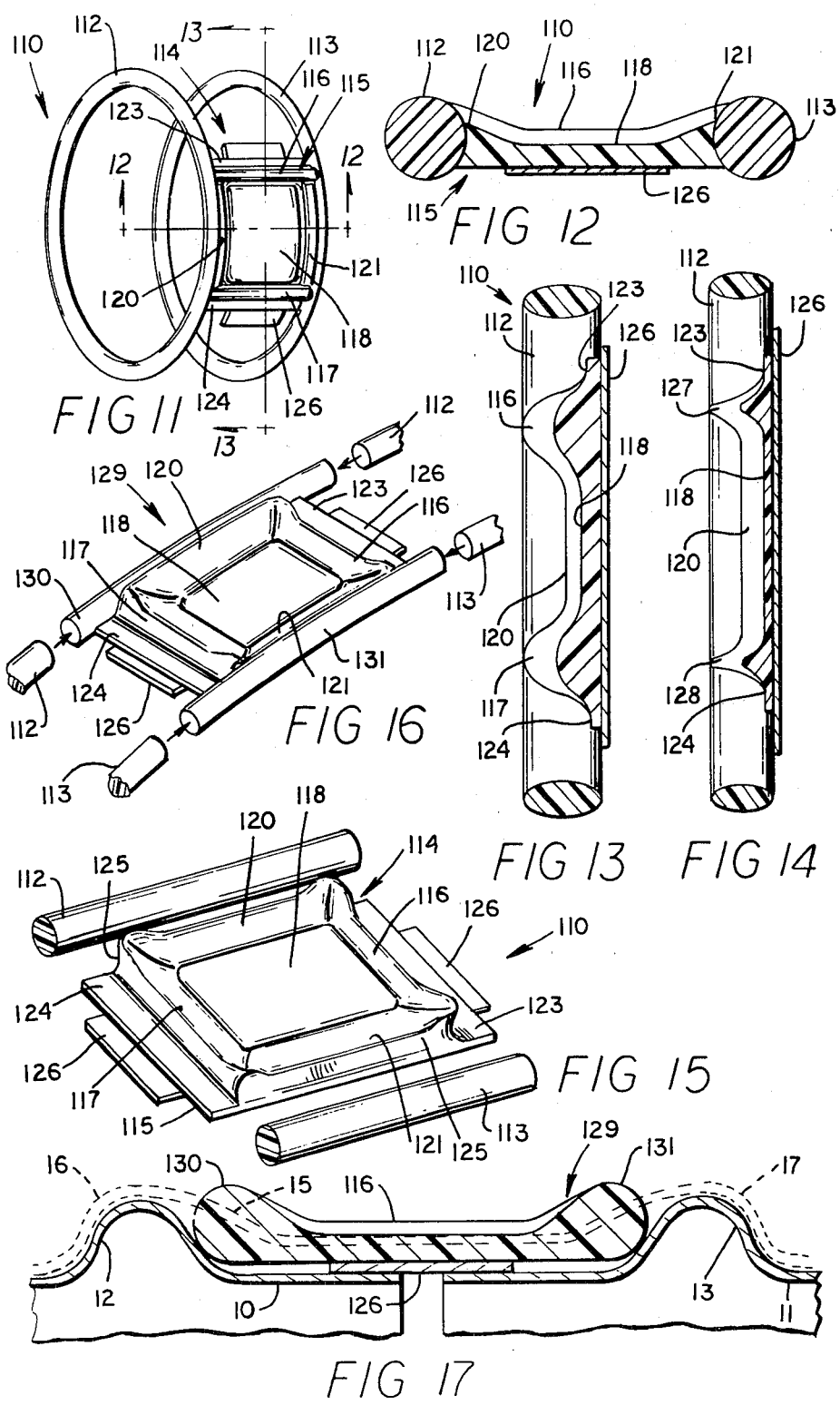

PIPE COUPLING WITH IMPROVED GASKET

CROSS-REFERENCE TO RELATED APPLICATION

This application is a continuation-in-part of application Ser. No. 117,665, filed Feb. 1, 1980, now abandoned.

TECHNICAL FIELD

This invention relates to pipe couplings and particularly to couplings for connecting two separate ends of fluid conveyed pipe lines and the like.

BACKGROUND ART

The coupling or interconnecting of adjacent pipe ends to form a continuous fluid conveying line is an area which embraces a great variety of problems. First, the coupling must be economical to produce and easily and quickly installed without expensive equipment and highly skilled employees. Second, it must seal the joint against escape of fluids and against intrusion of outside contaminants. Third, it must provide electrical continuity through the coupling from pipe end to pipe end, particularly where used underground for gas or fuel transmission and it is essential to provide cathodic protection, or above ground where the pipe must be grounded as in gasoline or jet fuel transmission. Fourth, it must be capable of use in a great variety of applications, for example, low or high pressures, lined or unlined pipe, and straight line and non-straight line applications. Fifth, it must be strong and safe, that is, its form and construction must be such that it can be designed to handle the most extreme conditions of pressure and the like which would be likely to be encountered in the service for which designed. These several problems and criteria are well known in the trade and a great variety of couplings have been proposed over the years for their solution.

The problem of sealing pipe joints has often been approached by providing gaskets to seal all possible pathways from the interior of the pipe sections to the exterior of the coupling through which fluid might escape. Typically, a coupling for joining two abutting pipe ends either includes two semi-cylindrical pieces which are fastened together to clamp down on the pipe ends, or a single cylindrical piece having an axial slit which allows the coupling to be opened by an amount sufficient to fit over the pipe ends. A major portion of the sealing function can be accomplished by placing annular gasket members, such as O-rings, around the respective pipe sections near their ends. However, this leaves the problem of sealing the fluid pathway through the axial joints in the coupling itself. One approach, as shown in U.S. Pat. No. 2,913,262 and U.S. Pat. No. 3,153,550, has been to provide an axial gasket member extending between the O-rings within the axial joints of the coupling. Another approach, as shown in U.S. Pat. No. 1,607,943 and in French Pat. No. 355,620, has been to provide an annular central web connecting the O-rings, completely surrounding the pipe ends and spanning the gap between the pipe ends. This solution has the disadvantage that if the web is physically pressed by the coupling against the pipe ends, sharp or ragged pipe ends may lead to early deterioration of the gasket. If the web is not pressed against the pipe ends by the coupling, as is the case in the above-identified French patent, then the pressure of fluid within the pipes must be relied upon to maintain the seal of the joint.

SUMMARY OF THE INVENTION

The present invention provides a pipe joint which solves problems experienced in the prior art by utilizing a pipe coupling having particular features in combination with a novel gasket. A gasket according to the invention comprises a pair of spaced apart annular gasket members joined together by a web only along a portion of their respective circumferences and positioned in use so as to span an axial joint in a pipe coupling. The gasket can include a web which defines a pair of elevated cross ridges extending between the annular members or O-rings at opposite ends of the web, and a depressed central portion of the web bounded by the annular members and the elevated cross ridges; the gasket can also include shield means attached to the inner surface of the connecting web for protecting the web from contact with sharp pipe ends.

A gasket according to the invention is particularly useful in a pipe joint comprising an annular radially outwardly extending flange having an arcuate cross-section on the periphery of each pipe adjacent and spaced from each pipe end; a cylindrical coupling member including at least one axial slit through the cylindrical wall thereof and a pair of annular arcuate grooves extending outwardly from the interior of the coupling member, each of the grooves being located to matingly receive one of the annular arcuate flanges, one of the flange and the groove being asymmetrical on the side thereof nearest the pipe ends so as to form a substantially enclosed annular space between the flange and the groove for receiving the annular gasket members or O-rings; and means for drawing the coupling member tightly about the pipe ends and the gasket.

Thus, it is an object of the present invention to provide a novel gasket for sealing a pipe joint.

It is a further object of the present invention to provide a gasket for sealing a pipe joint in cooperation with a cylindrical pipe coupling such that any means can be utilized to draw the coupling member tightly about the gasket and pipe ends to form a tightly sealed joint.

It is a further object of the present invention to provide a gasket for a pipe joint that is shielded from detrimental contact with sharp pipe ends when forced against the pipe ends by a pipe coupling.

It is a further object of the present invention to provide a gasket for a pipe joint having a novel contour and shape for efficient sealing of the pipe joint.

It is a further object of the present invention to provide an improved pipe coupling and gasket combination for sealing a pipe joint.

Other objects, features and advantages of the present invention will become apparent upon reading the following detailed description of embodiments of the invention, when taken in conjunction with the accompanying drawings and the appended claims.

BRIEF DESCRIPTION OF THE DRAWINGS

FIG. 11 is an isometric view of a fourth embodiment of a gasket according to the invention.

FIG. 12 is a circumferential cross-sectional view of the connecting member of the gasket shown in FIG. 11, taken along line 12—12 of FIG. 11.

FIG. 13 is an axial cross-sectional view of the connecting member of the gasket of FIG. 11, taken along line 13—13 of FIG. 11.

FIG. 14 is an axial cross-sectional view of an alternate embodiment of the connecting member for a gasket of the type shown in FIG. 11.

FIG. 15 is an isometric exploded view of a connecting member of a gasket of the type shown in FIG. 11, wherein the connecting member is bonded to continuous O-rings.

FIG. 16 is an isometric exploded view of an alternate embodiment of a connecting member wherein the connecting member and O-ring sections are integrally formed and bonded to O-ring sections to form a gasket of the type shown in FIG. 11.

FIG. 17 is a circumferential cross-sectional view of a gasket of the type shown in FIG. 16, showing its relationship to the pipe ends and pipe coupling of a pipe joint according to the invention.

DETAILED DESCRIPTION

Figure 1:
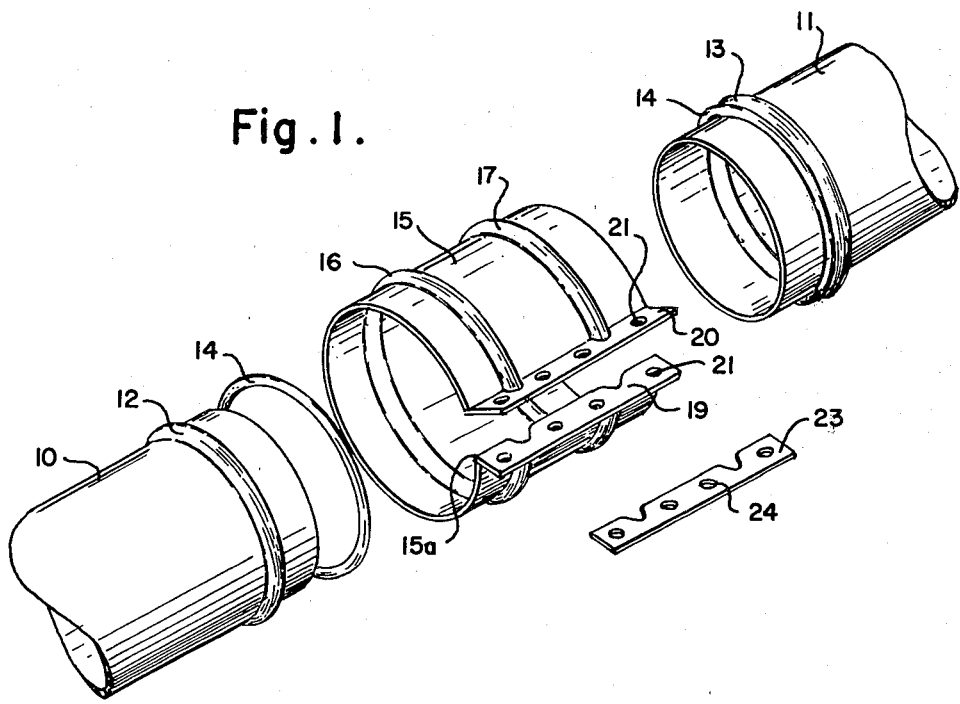
FIG. 1 is an isometric exploded view of a pair of pipe ends and coupling according to the invention.
Figure 2:
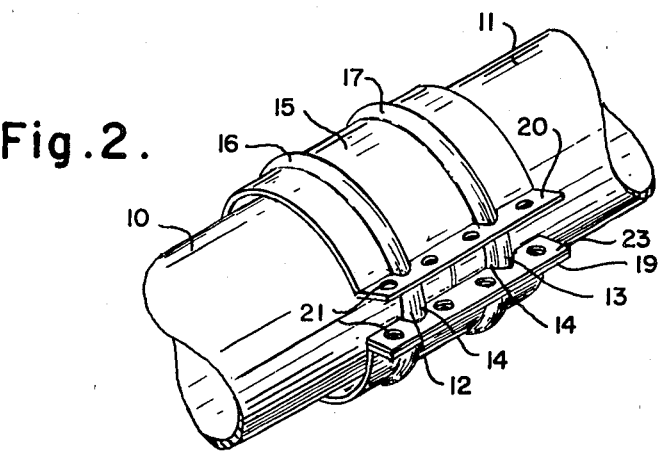
FIG. 2 is an isometric view of the pipe ends and coupling of FIG. 1 in the assembled unclosed position.
Figure 3:
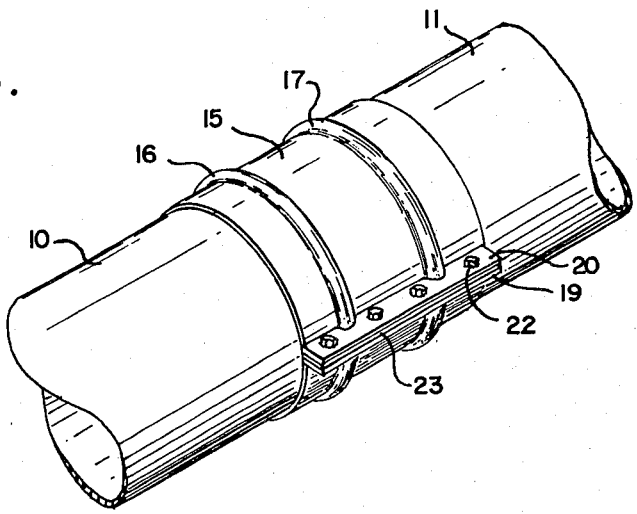
FIG. 3 is an isometric view of the completed pipe joint of FIGS. 1 and 2.
Figure 4:
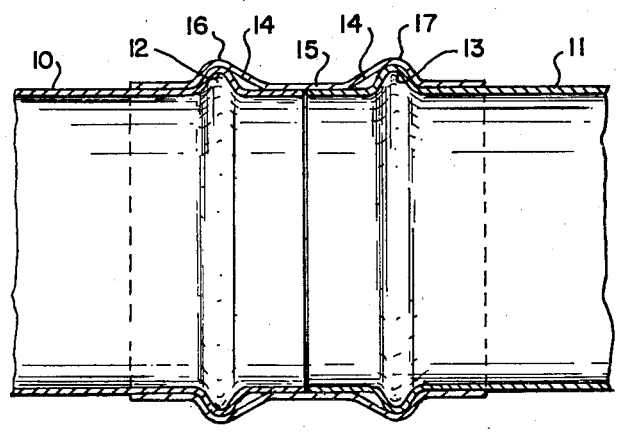
FIG. 4 is a vertical section through the joint of FIG. 3.

Referring to the drawing, two pipe ends 10 and 11 are shown each having an annular flange 12 and 13 rolled outwardly at a point spaced from the ends to form a continuous hump. An O-ring 14 is slid over each pipe end and against the annular flanges 12 and 13. A generally cylindrical coupling 15 split lengthwise by an axial slit 15a down the side thereof and having two annular grooves on the inside and corresponding flanges on the outside 16 and 17 intermediate its ends and generally corresponding to annular flanges 12 and 13, is placed over the two ends. Each edge of the slit 15a is provided with a radial flange 19 and 20 having openings 21 to receive bolts 22. A rubber gasket 23 corresponding in shape to flanges 19 and 20 having openings 24 corresponding to opening 21 is placed between flanges 19 and 20. Bolts 22 are inserted through openings 21 and 24, and lock washers 25 and nuts 26 are threaded on bolts 22 and tightened to compress the O-rings 14 and gasket 23 sealingly against flanges 12 and 13 and the pipe ends to join and seal the pipe ends.

Figure 5:
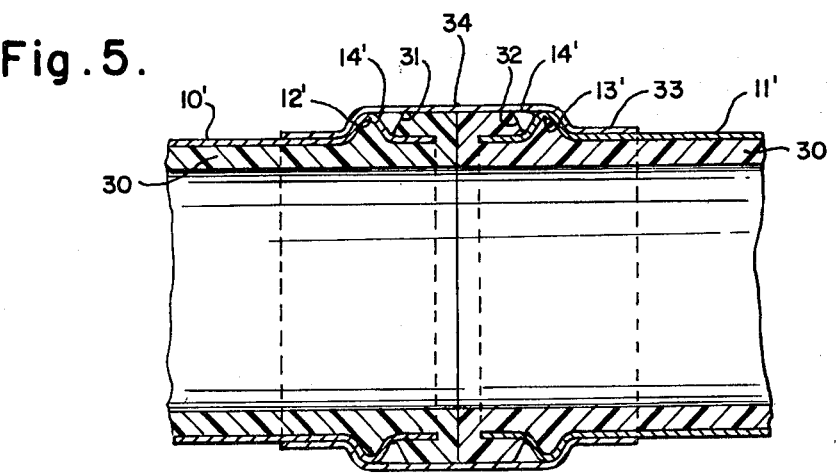
FIG. 5 is a vertical section through a second embodiment of pipe and joint for abrasive service.

FIG. 5 shows a second embodiment of the invention for abrasive service in which like parts to those in FIGS. 1-4 are given like numerals with a prime sign. In this embodiment the pipes are lined with a polybutylene liner 30 after the flanges 12' and 13' have been rolled in place and the liner is heat formed over the ends of the pipe to a point adjacent the flanges 12' and 13' to form annular grooves 31 and 32 between the formed liner ends and the flanges. The O-ring gaskets 14' or rubber V gaskets are placed in these grooves 31 and 32. The slit cylindrical coupling member 33 has a single annular channel 34 sufficiently wedged to embrace both flanges 12' and 13' and the formed liner ends. Radial flanges are provided along the slit side opening of the coupling member 33. Openings for bolts and a gasket with bolt openings therein are provided in the radial flanges. Inserting the bolts into the bolt openings and adding lock washers and nuts and tightening the same completes the sealed joint in a manner similar to that described above in connection with the first embodiment.

Figure 6:
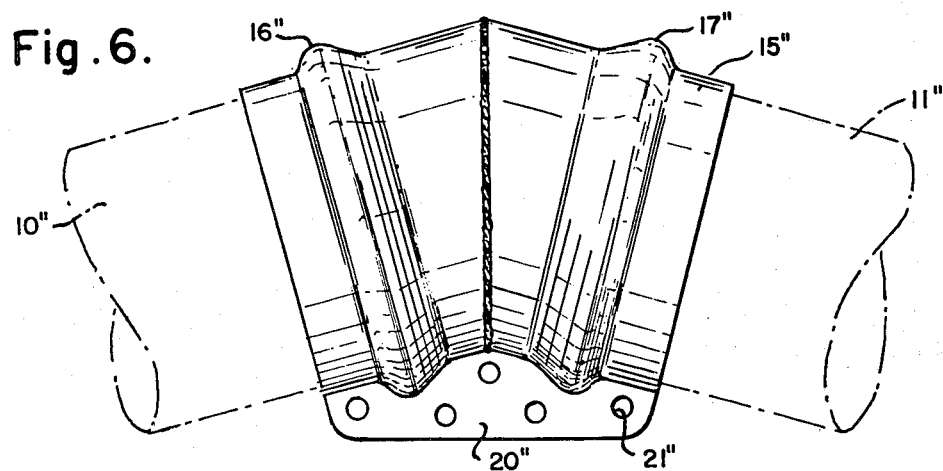
FIG. 6 is a top view of a 30 degree mitered coupling according to the invention.

FIG. 6 illustrates a 30 degree mitered coupling according to the invention. Its operation is the same as in FIGS. 1-4 and a detailed description is not believed necessary. Like parts with those of FIGS. 1-4 are given like numerals with a double prime sign.

Figure 7:
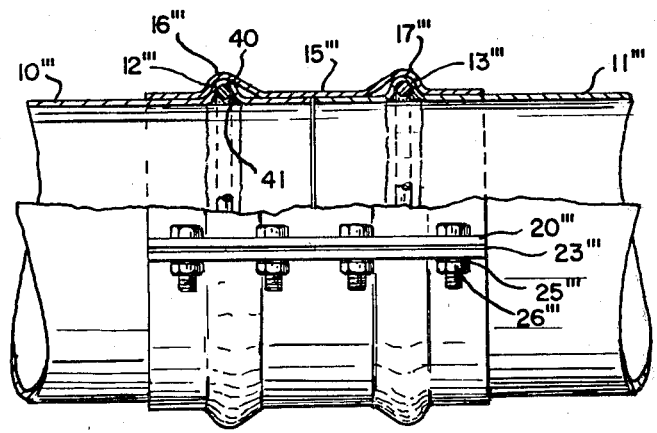
FIG. 7 is a vertical section through a third embodiment of pipe joint for high pressure service.

FIG. 7 is a vertical section through a third embodiment of the invention designed for high pressure service. In this embodiment, all elements are identical to those of FIGS. 1-4 and bear like numerals with a triple prime sign. The only difference is that a metal rod 40 is placed in the inside of each flange 12''' and 13''' and welded in place to prevent the flange from being flattened and forced out of the grooves in the coupling member under high pressure. An epoxy grouting material 41 can be wiped into the area around the welds to insure a smooth internal surface and prevent turbulence of fluid in the pipe. The coupling can be made to the desired strength level.

Figure 8:
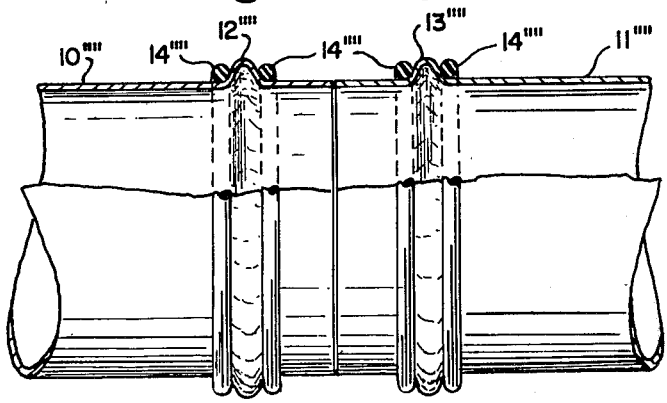
FIG. 8 is a second embodiment of an annular gasket arrangement according to the invention.
Figure 9:
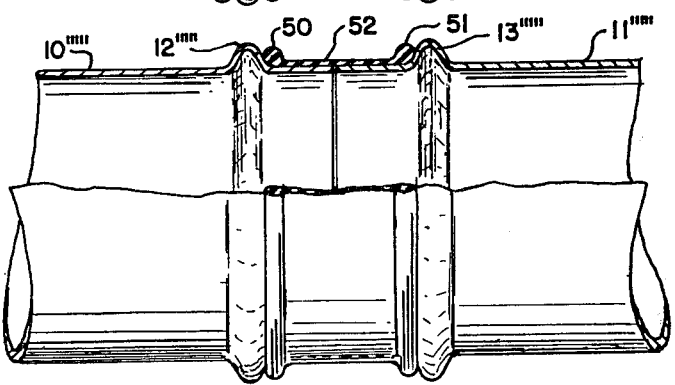
FIG. 9 is a third embodiment of an annular gasket arrangement for use in external corrosive atmospheres. This embodiment also eliminates need for the bolted flange gasket.

FIGS. 8 and 9 illustrate two gasket modifications. In FIG. 8 an O-ring is placed on each side of the flanges 12'''' and 13'''' to prevent corrosive fluids from the exterior entering the coupling and weakening it. FIG. 9 illustrates a gasket having two O-rings 50 and 51 and a connecting membrane 52 as an integral element extending between flanges 12''''' and 13'''''.

Figure 10:
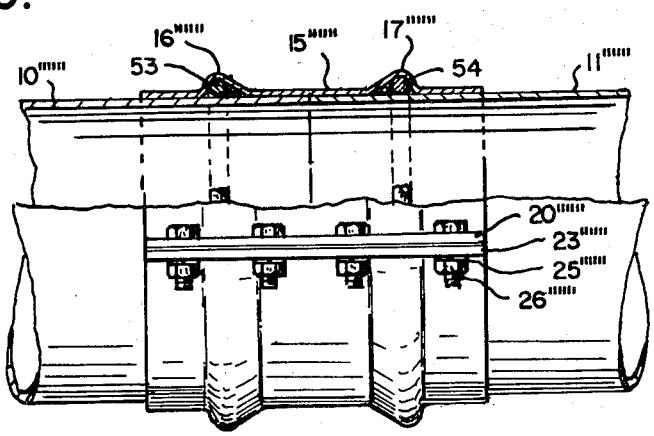
FIG. 10 is a side elevational view, partly in section, of a fourth embodiment of pipe and joint for field connections or where a smooth inside diameter is desired.

FIG. 10 illustrates a form of joint designed for use when field conditions require that the pipe be cut and new ends be made on location in the field or where the pipe is to be used for abrasive or other service requiring a smooth inside diameter of the pipe. In this embodiment, all elements are identical to those of FIGS. 1-4 and bear like numerals with six prime signs. The only difference is that annular flanges (12 and 13-FIG. 1) are formed by welding round bar rings 53 and 54 to the outside of the pipe a certain distance from the end of each thereby leaving the pipe inside diameter smooth and uninterrupted. The rings 53 and 54 may be tack-welded or fully welded, depending on the intended service.

FIG. 11 shows a further gasket modification for use with a pipe joint of the type shown in FIG. 1. FIG. 11 shows a gasket 110 which includes a pair of O-rings 112 and 113 disposed in coaxial, parallel relationship and joined along a portion of their respective circumferences by a connecting member 114. When a gasket 110 is used with a pipe coupling 15, as shown in FIG. 1, the circumferential length of the connecting member 114 should be about equal to or slightly greater than the distance between the flanges 19 and 20 in their unclosed position. This is typically less than one-quarter of the circumference of the O-rings 112 and 113, and could be, for example 6-7 inches for a pipe joint in which the pipe diameter was 14-20 inches. If a two-piece coupling is utilized, a second connecting member 114 (not shown) would be provided opposite the first connecting member, so that both axial joints of the coupling would be sealed.

The connecting member 114, as shown in FIGS. 11-13 and 15, comprises a web 115 of gasket material which extends between and joins the O-rings 112 and 113. The web 115 defines a pair of parallel cross ridges 116 and 117 which extend between the O-rings and are generally perpendicular thereto. The height of the cross ridges 116 and 117 in the radial direction is approximately equal to the diameter of the O-rings where the ends of each cross ridge meet the O-rings; the cross ridges taper to a lesser height at a position between the O-rings. The web 115 defines a depressed central portion 118 which is bounded by the O-rings and the cross ridges, and has a height less than the minimum height of the cross ridges, as best shown in FIG. 12. In the preferred embodiment of the invention, the web 115 defines a pair of parallel side ridges 120 and 121 which are formed by a gradual thickening of the web along the sides of the web from the depressed central portion 118 upwardly as the web approaches the O-rings 112 and 113. However, the maximum height of the side ridges 120 and 121 is preferably somewhat less than the maximum height of the cross ridges 116 and 117.

The web 115 also defines a pair of web extensions 123 and 124, each located adjacent to the cross ridges 116 and 117, respectively, outwardly of the depressed central portion 118 and extending between the O-rings 112 and 113. In order to protect the connecting member 114 from sharp or ragged pipe ends, a shield 126 is attached to the inner surface of the web 115, extending at least the entire circumferential length of the web 115. The shield 126 is preferably constructed of a relatively thin sheet of a strong material, such as stainless steel, which can protect the gasket material from wear caused by the pipe ends. The shield 126 should be flexible enough to conform to the curvature of the pipe ends, or should be formed initially to match the curvature of the pipe ends. The shield 126 can be attached to the web 115 by adhesive, by rivets passing through the shield and the web extensions 123 and 124, or by forcing holes in the shield over button-like projections formed integrally with the inner surface of the web. The curvature of the shield 126 gives it strength and lends rigidity to the pipe joint in the axial dimension.

As shown in FIG. 13, the cross ridges 116 and 117 of the gasket shown in FIG. 11 are curved in profile. An alternate structure is shown in FIG. 14, wherein cross ridges 127 and 128 are more triangular in profile.

The gasket shown in FIG. 11 can be formed in several ways. It can be molded as a single integral gasket, prior to attachment of the shield 126, but the shape of the combined O-rings and connecting member would make this an expensive alternative. The embodiment of the gasket 110 of FIGS. 11 and 12 is shown in exploded view in FIG. 15. The connecting member 114 is molded as an integral part except for the shield 126. The web 115 is molded to define a pair of parallel concave depressions 125 along the sides of the web 115 to receive complete O-rings 112 and 113. In order to attach the O-rings to the web, the parts may be welded or vulcanized, or attached with an adhesive such as a cyanoacrylate adhesive. An alternate embodiment of the gasket 129 is shown in FIG. 16. In this embodiment, a pair of O-ring-shaped sections 130 and 131 are integrally molded with the connecting member 114. The O-rings 112 and 113 are severed or provided as long cylindrical pieces and are attached end-to-end to the O-ring sections 130 and 131, respectively. It will be apparent from a consideration of the embodiments shown in FIGS. 15 and 16 that the connecting members 114 or 129 can be produced and used in pipe joints having a wide range of pipe diameters.

In use, after assembly of the O-rings and the connecting member into the form shown in FIG. 11, the O-rings 112 and 113 are fitted over the adjacent pipe ends 10 and 11, respectively, until they are adjacent to the flanges 12 and 13. FIG. 17 shows a vertical circumferential cross-sectional view of the pipe joint taken through the connecting member 129, which is the type shown in the embodiment of FIG. 16. The position of the coupling 15 when tightened about the pipe ends is shown in dashed lines in FIG. 17. It will be seen in FIG. 17 that the coupling 15 presses the connecting member 129 across its entire width, and therefore would tend to compress the gasket material into the space between the adjacent pipe ends 10 and 11. However, the shield 126 lies between the pipe ends and the coupling 15, and therefore protects the gasket against accelerated wear that could be caused by sharp or ragged ends of the pipe. The relatively short circumferential length of the connecting member 129 minimizes the area of gasket that must be protected from the pipe ends, and also makes it more easy to install a one piece coupling of the type shown in FIG. 1 onto the pipe ends. The contours of the connecting member 129 as described above result in the connecting member being substantially uniformly compressed against the pipe ends, with the cross ridges 116 and 117 providing a particularly tight seal at critical points on either side of the axial joint in the coupling 15 in order to prevent fluid passing from the interior of the pipes into the space between the pipes and the coupling from escaping through the coupling joint. Fluid pressure in pipe lines for which the pipe joint of the present invention is designed may reach over 300 psi for pipes for about 16-18 inches in diameter, and over 1000 psi for smaller diameter pipes. However, the configuration of a gasket embodying the present invention is such that the flanges 19 and 20 of the coupling 15 need not be tightened completely until they meet one another to obtain a sealed joint, as is the case in some prior couplings. This enables non-expert workers to assemble the pipe joint in the field.

If a pipe joint as shown in FIG. 17 is to be utilized for a non-linear joint, the connecting member 114 or 129 and the axial joint in the coupling 15 are placed at the circumferential position around the pipe ends where the pipe ends are closest together, that is, at the point of least deflection of the pipe ends from one another.

A gasket according to the present invention can be constructed of any known gasket material, but is preferably constructed of a compressible gasket material, such as neoprene.

It will thus be seen that a pipe joint according to the present invention provides a novel pipe coupling and gasket combination which is economical of construction, is long wearing compared to prior pipe joints, and provides a secure, fluid-tight seal.

While this invention has been described in detail with particular reference to preferred embodiments thereof, it will be understood that variations and modifications can be effected within the spirit and scope of the invention as described hereinbefore and as defined in the appended claims.

I claim:

1. A gasket for forming a seal between two adjacent pipe ends and a coupling spanning the two pipe ends, comprising:
   a pair of spaced apart O-rings joined along a portion of their respective annular bodies by a connecting member;
   said connecting member comprising a web of flexible material defining parallel sides, each of said sides being bonded along its length to one of said O-rings, a pair of elevated cross ridges extending between said O-rings at opposite ends of said connecting member, and a depressed central portion bounded by said O-rings and said elevated cross ridges.

2. The gasket of claim 1 further comprising an arcuate sheet of rigid material fixed to the inner surface of said web of flexible material, the curvature of said sheet approximately matching the curvature of the outside circumference of said pipe ends.

3. The gasket of claim 2, wherein said sheet of rigid material comprises stainless steel.

4. The gasket of claim 1 wherein each of said elevated cross ridges tapers in height from a maximum height, at the points where the ends of the ridge meet said O-rings, of approximately the diameter of the cross-section of said O-rings, to a minimum height, at the center of the ridge, intermediate said diameter of said O-rings and the height of said depressed central portion.

5. The gasket of claim 1, wherein said web between said elevated cross ridges defines elevated side ridges along the parallel sides of said web, said side ridges being bonded to said O-rings and tapering down to said depressed central portion.

6. The gasket of claim 5 wherein said web of flexible material further defines a pair of web extensions located one adjacent to each of said elevated cross ridges outwardly of said depressed central portion and extending between said O-rings.

7. The gasket of claim 6 further comprising a sheet of metal attached to the inner surface of said web of flexible material and extending circumferentially the length of said web including said web extensions.

8. A pipe joint for joining a pair of adjacent pipe ends, comprising:
   an annular radially outwardly extending flange having an arcuate cross-section on the periphery of each pipe adjacent and spaced from each pipe end;
   a cylindrical coupling member including at least one axial slit through the cylindrical wall thereof and a pair of annular arcuate grooves extending outwardly from the interior of said coupling member, each of said grooves being located to matingly receive one of said annular arcuate flanges, one of said flange and said groove being asymmetrical on the side thereof nearest said pipe ends so as to form an annular space between said flange and said groove;
   gasket means for sealing the pipe joint comprising a pair of spaced apart annular members shaped to be fitted over said pipe ends and compressed within said annular spaces, a connecting web extending between and joining said annular members along a portion of their circumferences, said web being positioned under said axial slit of said coupling member between said annular spaces, and comprising a pair of elevated cross ridges extending between said annular members at opposite ends of said web, and a depressed central portion bounded by said annular members and said cross ridges; and
   means for drawing said coupling member tightly about said pipe ends.

9. The pipe joint of claim 8 wherein said cylindrical coupling member includes a pair of radial flanges extending from each side of said axial slit, and wherein said means for drawing said coupling member tightly about said slit comprises means for drawing said radial flanges together.

10. The pipe joint of claim 8 wherein said annular radially outwardly extending flanges comprise annular members fixed to the periphery of each pipe.

11. A connecting web for sealing an axial joint of a pipe coupling, said coupling being formed to receive O-rings surrounding adjacent pipe ends, comprising:
    a depressed central area having a height less than half the diameter of said O-rings;
    a pair of parallel cross ridges extending along opposite ends of said central area, said cross ridges tapering from a maximum height, at the ends of said cross ridges, approximately equal to the diameter of said O-rings, to a minimum height, at the center of each cross ridge, intermediate the height of said central portion and the diameter of said O-rings;
    a pair of parallel side ridges, joining said cross ridges along the sides of said central portion, said side ridges having a height at the center thereof intermediate the height of said central portion and the diameter of said O-rings, and tapering upwardly in height to meet said cross ridges;
    said side ridges and cross ridges defining, along the sides of said connecting member, concave recesses for matingly receiving said O-rings.

12. The web of claim 8 or 11, wherein said web comprises neoprene.

* * * * *